(12) United States Patent
Kobayashi

(10) Patent No.: US 10,690,963 B2
(45) Date of Patent: Jun. 23, 2020

(54) LIQUID CRYSTAL ILLUMINATION DEVICE, HEAD UP DISPLAY, AND ILLUMINATION METHOD

(71) Applicant: JVCKENWOOD Corporation, Yokohama-shi, Kanagawa (JP)

(72) Inventor: Tatsuru Kobayashi, Yokohama (JP)

(73) Assignee: JVCKENWOOD Corporation, Yokohama-Shi (JP)

( * ) Notice: Subject to any disclaimer, the term of this patent is extended or adjusted under 35 U.S.C. 154(b) by 0 days.

(21) Appl. No.: 16/598,943

(22) Filed: Oct. 10, 2019

(65) Prior Publication Data

US 2020/0041847 A1 Feb. 6, 2020

Related U.S. Application Data

(63) Continuation of application No. PCT/JP2018/037695, filed on Oct. 10, 2018.

(30) Foreign Application Priority Data

Dec. 14, 2017 (JP) .................................. 2017-239369

(51) Int. Cl.
*G02F 1/13357* (2006.01)
*G02B 27/01* (2006.01)
*F21V 8/00* (2006.01)
*G02B 6/00* (2006.01)

(52) U.S. Cl.
CPC .......... *G02F 1/133611* (2013.01); *G02B 6/00* (2013.01); *G02B 6/0058* (2013.01); *G02B 27/0101* (2013.01); *G02F 1/133605* (2013.01); *G02F 1/133606* (2013.01); *B60K 2370/1529* (2019.05)

(58) Field of Classification Search
CPC ......... G02F 1/133602; G02F 1/133606; G02F 1/133611; G02B 6/00; G02B 6/0058; G02B 27/0101; G02B 27/0172; B60K 2370/1529
See application file for complete search history.

(56) References Cited

U.S. PATENT DOCUMENTS

2008/0285139 A1* 11/2008 Chen .................. G02B 27/0101
359/630
2010/0149787 A1* 6/2010 Zhang .................. G02B 6/0043
362/97.1

FOREIGN PATENT DOCUMENTS

JP      2009-003444 A      1/2009

* cited by examiner

*Primary Examiner* — Thanh Nhan P Nguyen
(74) *Attorney, Agent, or Firm* — Procopio, Cory, Hargreaves & Savitch LLP

(57) ABSTRACT

The liquid crystal illumination device includes a light source projecting light to a liquid crystal panel, a first diffusion unit diffusing the projected light, a first light guide unit including a radially widened reflection surface and reflect the diffused light at the reflection surface, a reflecting mirror including an opening, part of the light guided by the first light guide unit being reflected and returned to inside the first light guide unit, and remaining light passing through the opening, a light collecting unit collecting light passing through an opening on the reflecting mirror, and a second diffusion unit diffusing the collected light toward the liquid crystal panel. The opening on the reflecting mirror is formed correspondingly to a display region where the liquid crystal panel display an image. A haze value of the first diffusion unit is set to a value higher than that of the second diffusion unit.

5 Claims, 7 Drawing Sheets

LIQUID CRYSTAL ILLUMINATION DEVICE, HEAD UP DISPLAY, AND ILLUMINATION METHOD

CROSS REFERENCE TO RELATED APPLICATIONS

This application is based upon and claims the benefit of priority from Japanese patent application No. 2017-239369, filed on Dec. 14, 2017, and is a Continuation of International application No. PCT/JP2018/037695 filed on Oct. 10, 2018, the disclosure of which are incorporated herein in its entirety by reference.

BACKGROUND

The present invention relates to a liquid crystal illumination device, a head up display, and an illumination method that illuminate a liquid crystal panel.

A liquid crystal illumination device guiding light projected from a light source to a liquid crystal panel side by a light guide unit, returning the light to the light source by a reflection member arranged on an exit side of the light guide unit, and use the light as recycled light is known (see Japanese Unexamined Patent Application Publication No. 2009-003444). On an entrance side of the light guide unit, an opening is formed correspondingly to the light source, and a reflective plate reflecting recycled light to the liquid crystal panel side is provided.

SUMMARY

In the aforementioned liquid crystal illumination device, recycled light returned to the light source side by the reflection member is reflected and returned to the liquid crystal panel side again by the reflective plate arranged on the entrance side of the light guide unit. However, part of the recycled light enters the opening, and is not reflected and returned to the liquid crystal panel side. Consequently, the recycled light may not be sufficiently used.

The present embodiment for achieving the aforementioned object is a liquid crystal illumination device including:

a liquid crystal panel;

a light source configured to project light to the liquid crystal panel;

a first diffusion unit configured to be provided adjacent to the light source and diffuse light projected from the light source;

a first light guide unit configured to be provided with the first diffusion unit at one end, include a reflection surface formed in such a way as to radially widen from the light source side toward the liquid crystal panel side, reflect light diffused by the first diffusion unit at the reflection surface, and guide the light;

a reflecting mirror configured to be provided at another end of the first light guide unit, an opening being formed on the reflecting mirror, part of the light guided by the first light guide unit being reflected and returned to inside the first light guide unit, and remaining light passing through the opening;

a light collecting unit configured to be provided adjacent to the reflecting mirror and collect light passing through the opening on the reflecting mirror; and a second diffusion unit configured to be provided adjacent to the light collecting unit and diffuse the light collected by the light collecting unit toward the liquid crystal panel, wherein the opening on the reflecting mirror is formed to correspond to a display region where the liquid crystal panel display an image, and a haze value of the first diffusion unit is set to a value higher than a haze value of the second diffusion unit.

An aspect of the present invention for achieving the aforementioned object may be an illumination method for a liquid crystal illumination device including a liquid crystal panel and a light source configured to project light to the liquid crystal panel, the illumination method including:

a step of diffusing light projected from the light source by a first diffusion unit;

a step of reflecting light diffused by the first diffusion unit by a first light guide unit on a reflection surface and guiding the light, the first light guide unit including the reflection surface being formed in such a way as to radially widen from the light source side toward the liquid crystal panel side;

a step of reflecting part of light guided by the first light guide unit by a reflecting mirror on which an opening is formed and returning it to inside the first light guide unit, remaining light passing through the opening;

a step of collecting the light passing through the opening on the reflecting mirror; and a step of diffusing the collected light toward the liquid crystal panel by a second diffusion unit, wherein the opening on the reflecting mirror is formed to correspond to a display region where the liquid crystal panel display an image, and a haze value of the first diffusion unit is set to a value higher than a haze value of the second diffusion unit.

DETAILED DESCRIPTION

First Embodiment

Figure 1:
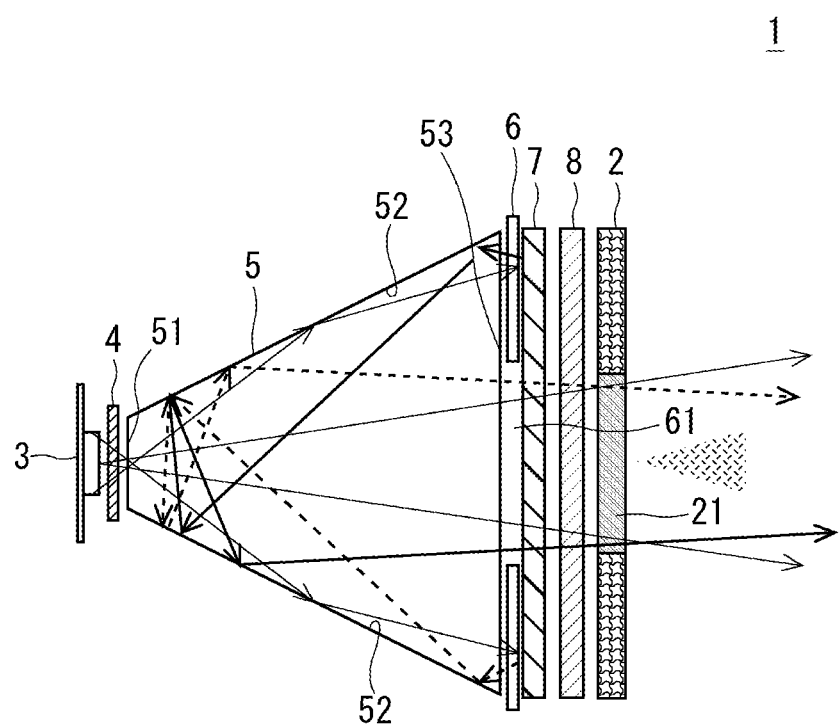
FIG. 1 is a diagram illustrating a schematic configuration of a liquid crystal illumination device according to a first embodiment of the present invention.

Embodiments of the present invention will be described below with reference to drawings. FIG. 1 is a diagram illustrating a schematic configuration of a liquid crystal illumination device according to a first embodiment of the present invention. The liquid crystal illumination device (1) according to the present first embodiment can illuminate a liquid crystal panel at uniform luminance. The liquid crystal illumination device (1) includes a liquid crystal panel (2), a light source (3), a first diffusion unit (4), a first light guide unit (5), a reflecting mirror (6), a light collecting unit (7), and a second diffusion unit (8).

For example, the liquid crystal panel (2) includes a screen provided to face the light source (3) and forms an image in response to an external input signal on the screen. For example, the liquid crystal panel (2) is formed in an almost rectangular shape. For example, the liquid crystal panel (2) is configured as a transmissive TFT liquid crystal panel (2) with a diagonal size of 1.8 inches and a number of pixels at 480×240 (RGB dots). The liquid crystal panel (2) is transmissively illuminated by being irradiated with light by the light source (3).

The light source (3) projects light to the liquid crystal panel (2). For example, the light source (3) is composed of a light emitting diode (LED) but may be composed of a laser light source including a semiconductor laser, a xenon lamp, a fluorescent display tube, or the like, without being limited to an LED. For example, the light source (3) is composed of a plurality of LEDs.

The first diffusion unit (4) is provided between the light source (3) and the first light guide unit (5). The first diffusion unit (4) is provided adjacent to the light source (3) and diffuses light projected from the light source (3). The first diffusion unit (4) diffuses light from the light source (3) toward an entrance opening (51) of the first light guide unit (5). For example, the first diffusion unit (4) is composed of a lens diffusion plate or the like.

The first diffusion unit (4) is configured to provide a high degree of diffusion. A haze value of the first diffusion unit (4) is set to a value higher than a haze value of the second diffusion unit (8). For example, the haze value of the first diffusion unit (4) is set to 90% or higher.

Figure 2:
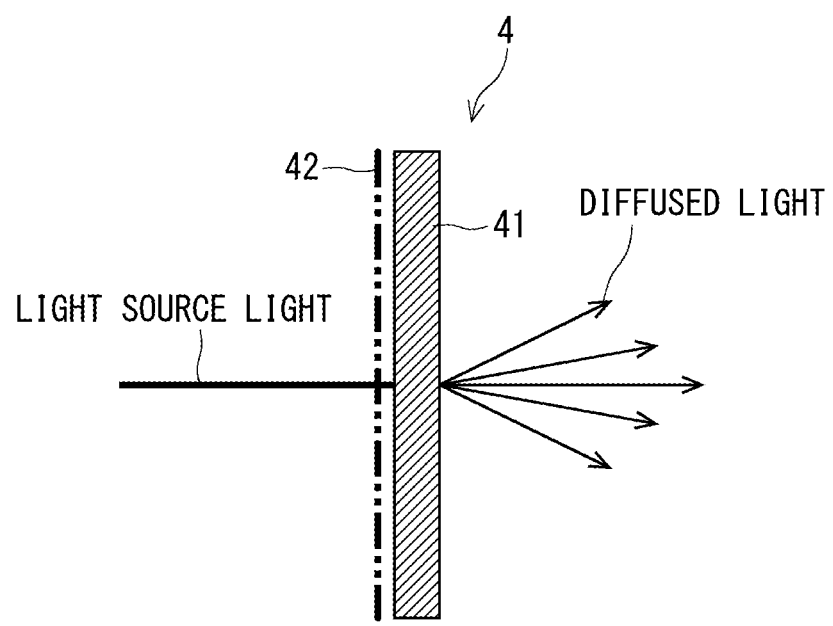
FIG. 2 is a diagram illustrating a configuration of a first diffusion unit.

For example, as illustrated in FIG. 2, the first diffusion unit (4) includes a substrate (41) and a diffusing surface (42) being provided on a side surface of the substrate (41) on the light source (3) side and diffusing light. The substrate (41) is a plate-shaped member composed of a resin or a glass material. Light source light from the light source (3) enters the diffusing surface (42) of the first diffusion unit (4) and exits from the substrate (41) as diffused light. At this time, although a loss due to reflection at the substrate (41) occurs, most of light source light penetrates the substrate (41).

The first light guide unit (5) is a tubular member including rectangular openings at both ends. The first diffusion unit (4) is provided on the entrance opening (51) formed at one end of the first light guide unit (5). The first light guide unit (5) guides light diffused by the first diffusion unit (4). The first light guide unit (5) includes a reflection surface (52) formed in such a way as to radially widen from the light source (3) side toward the liquid crystal panel (2) side.

Light exiting from the entrance opening (51) at one end of the first light guide unit (5) repeats multiple reflection at the reflection surface (52) and exits from an exit opening (53) at the other end. An illumination distribution at the liquid crystal panel (2) can be uniformed by such multiple reflection at the reflection surface (52).

The reflecting mirror (6) is provided on the exit opening (53) at the other end of the first light guide unit (5). An opening (61) passing light from the exit opening (53) on the first light guide unit (5) is formed in a central part of the reflecting mirror (6). The opening (61) on the reflecting mirror (6) is formed in an almost rectangular shape correspondingly to a display region (display pixel region) 21 where the liquid crystal panel (2) performs display. For example, the opening (61) on the reflecting mirror (6) is formed at a position facing the display region (21) of the liquid crystal panel (2) with an area equal to an area of the display region (21) or slightly larger than the area of the display region (21).

The reflecting mirror (6) reflects part of light from the exit opening (53) on the first light guide unit (5) and returns the light to inside the first light guide unit (5). Then, the light returned by the reflecting mirror (6) repeats multiple reflection again at the reflection surface (52) of the first light guide unit (5) and part of the light returns to the entrance opening (51). On the other hand, the remaining light passes through the opening (61) on the reflecting mirror (6) and enters the light collecting unit (7).

The light collecting unit (7) is provided adjacent to a surface of the reflecting mirror (6) opposite to the first light guide unit (5). The light collecting unit (7) collects light passing through the opening (61) on the reflecting mirror (6) toward the second diffusion unit (8) side. For example, the light collecting unit (7) is composed of a linear Fresnel lens. The light collecting unit (7) is formed in a rectangular shape correspondingly to the rectangular liquid crystal panel (2). The light collecting unit (7) is arranged in parallel with the liquid crystal panel (2) and the reflecting mirror (6). The light collecting unit (7) allows reduction of unnecessary beams entering at an incident angle exceeding a size of the liquid crystal panel (2) and can enhance light utilization efficiency.

The second diffusion unit (8) is provided adjacent to a surface of the light collecting unit (7) opposite to the reflecting mirror (6). The second diffusion unit (8) diffuses light collected by the light collecting unit (7) toward the liquid crystal panel (2). For example, the second diffusion unit (8) is composed of a lens diffusion plate or the like, similarly to the first diffusion unit (4).

For example, a diffusion angle of the second diffusion unit (8) is set to a small value. Consequently, for example, a backlit image being superimposed on the back part of a liquid crystal panel (2) display when the light source (3) is turned on can be suppressed, and display quality of the liquid crystal panel (2) can be enhanced.

As described above, while an area of the exit opening (53) on the first light guide unit (5) is an area corresponding to an area of the liquid crystal panel (2), the first light guide unit (5) has a tapered shape radially widening from the light source (3) side toward the liquid crystal panel (2) side.

Consequently, design of a light orientation conforming to a requirement on a light spread angle from the liquid crystal panel (2) is enabled. For example, in such a first light guide unit (5) with a tapered shape, light with a light orientation at ±90° at the light source (3) can be adjusted to, for example, a light distribution at ±10° at the exit opening (53) by adjusting areas of the entrance opening (51) and the exit opening (53) of the first light guide unit (5). For example, a light orientation of the light source (3) refers to a spread angle of light when a normal line of a light emitting surface of the light source (3) is assumed to be 0°.

For example, when a light orientation of the light source (3) is denoted as θ, and an area of the entrance opening (51) on the first light guide unit (5) is denoted as S, a relation between the above, and a light orientation θ' of exiting light from the first light guide unit (5) and an area S' of the exit opening (53) can be expressed by equation (1) below.

$$S \times (\sin \theta)^2 = S' \times (\sin \theta')^2 \qquad (1)$$

Next, in order to reduce the area of the liquid crystal panel (2), the area of the exit opening (53) on the first light guide unit (5) is optimized by use of aforementioned equation (1). With area reduction of the exit opening (53), the area of the entrance opening (51) on the light source (3) side also needs to be reduced.

Moreover, not an entire effective pixel region of the liquid crystal panel (2) is used as a display pixel region (21) where display is actually performed, and a used region of the effective pixel region may be limited.

Figure 3:
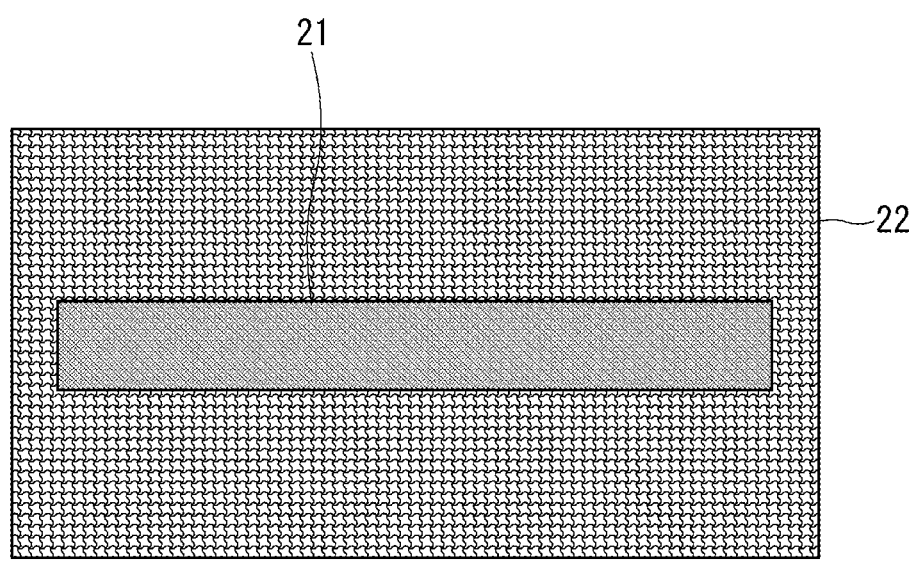
FIG. 3 is a diagram illustrating a liquid crystal panel.

For example, as illustrated in FIG. 3, within an effective pixel region (22) with a diagonal size of 1.12 inches and a number of pixels at 300×160 (RGB dots), only a display pixel region (21) with 268×32 dots is used as a used region. In this case, area design of the exit opening (53) on the first light guide unit (5) is also performed in accordance with aforementioned equation (1); however, when an exit area [≈ the area of the entrance opening (51) on the first light guide unit (5)] of the light source (3) cannot be sufficiently decreased compared with the area of the liquid crystal panel (2), a light orientation θ' of exiting light becomes too large.

On the other hand, for example, conventionally, increasing the area of the exit opening on the first light guide unit has been considered. However, in this case, an unused region of the liquid crystal panel is also irradiated with illumination light. The illumination light is absorbed by the liquid crystal panel, causes a temperature rise of the liquid crystal panel, and consequently, adversely affects contrast degradation and high-temperature reliability of the liquid crystal panel. On the other hand, for example, decreasing the area of the exit opening on the first light guide unit may also be considered. However, in this case, a light orientation of exiting light from the liquid crystal panel spreads; and the spread orientation component becomes stray light and degrades display quality.

Then, as described above, the liquid crystal illumination device 1 according to the present first embodiment includes the first diffusion unit (4) being provided adjacent to the light source (3) and the diffusing light projected from the light source (3), the first light guide unit (5) including the reflection surface (52) formed in such a way as to radially widen from the light source (3) side toward the liquid crystal panel (2) side, reflecting light diffused by the first diffusion unit (4) at the reflection surface (52), and guiding the light, and the reflecting mirror (6) on which the opening (61) is formed, part of the light guided by the first light guide unit (5) being reflected and returning to inside the first light guide unit (5), and the remaining light passing through the opening (61). Further, the opening (61) on the reflecting mirror (6) is formed correspondingly to the display region (21) where the liquid crystal panel (2) performs display. Additionally, a haze value of the first diffusion unit (4) is set to a value higher than a haze value of the second diffusion unit (8).

As described above, the opening (61) on the reflecting mirror (6) is formed correspondingly to the display region (21) where the liquid crystal panel (2) performs display, according to the present first embodiment. Consequently, part of light passing through the opening (61) on the reflecting mirror (6) enters the display region (21) of the liquid crystal panel alone (2) through the light collecting unit (7) and the second diffusion unit (8). Accordingly, light is not projected on a region other than the display region (21) of the liquid crystal panel (2), and therefore a temperature rise, contrast degradation, and high-temperature-based reliability degradation of the liquid crystal panel (2) can be suppressed.

On the other hand, the remaining light not passing through the opening (61) on the reflecting mirror (6) and being reflected and returned to the first light guide unit (5) by the reflecting mirror (6) repeats multiple reflection again at the reflection surface (52) of the first light guide unit (5) and returns to the entrance opening (51). The light returning to the entrance opening (51) enters the first diffusion unit (4) provided at the entrance opening (51) again.

Figure 4:
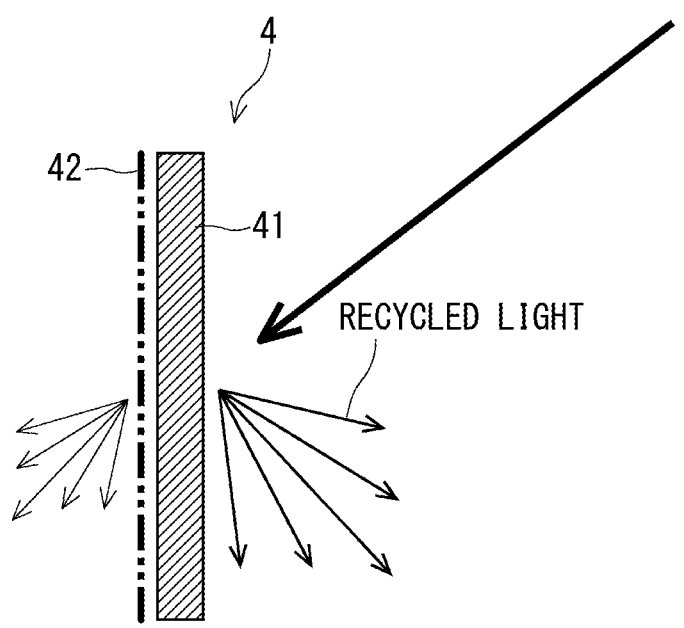
FIG. 4 is a diagram illustrating critical angle reflection at a diffusing surface of the first diffusion unit.

A haze value of the first diffusion unit (4) is set to a high value. Accordingly, for example, as illustrated in FIG. 4, the light enters the flat substrate (41) in the first diffusion unit (4) and is further diffused at the diffusing surface (42) on the exit side. Most of light critical-angle-reflects at the diffusing surface (42) and returns to inside the first light guide unit (5) from the entrance opening (51) again. The light returning to inside the first light guide unit (5) repeats multiple reflection again at the reflection surface (52) of the first light guide unit (5) and passes through the opening (61) on the reflecting mirror (6). The light passing through the opening (61) on the reflecting mirror (6) enters the display region of the liquid crystal panel (2) through the light collecting unit (7) and the second diffusion unit (8) as recycled light.

Thus, light conventionally entering a region other than the display region of the liquid crystal panel is caused to enter the display region (21) of the liquid crystal panel (2) as recycled light and is reused. Consequently, a high-efficiency and high-intensity liquid crystal panel (2) can be provided.

Figure 5:
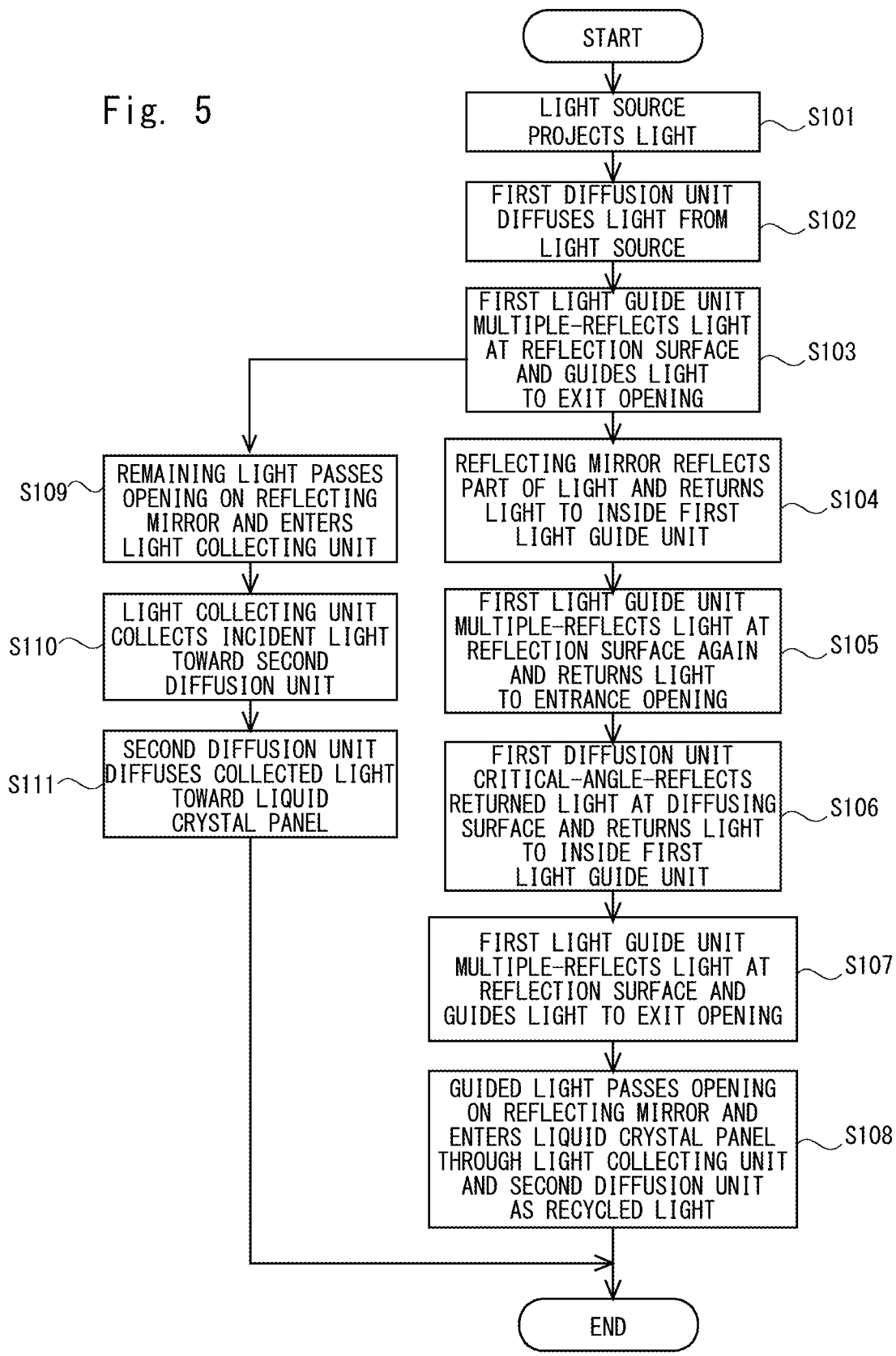
FIG. 5 is a flowchart illustrating a flow of an illumination method for the liquid crystal illumination device according to the first embodiment of the present invention.

FIG. 5 is a flowchart illustrating a flow of an illumination method for the liquid crystal illumination device according to the present first embodiment. The light source (3) projects light to the first light guide unit (5) (step S101).

The first diffusion unit (4) diffuses the light from the light source (3) toward the entrance opening (51) on the first light guide unit (5) (step S102). The first light guide unit (5) causes the light being diffused by the first diffusion unit (4) and entering from the entrance opening (51) to multiple-reflect at the reflection surface (52) and guides the light to the exit opening (53) (step S103).

The reflecting mirror (6) reflects part of the light from the exit opening (53) on the first light guide unit (5) and returns the light to inside the first light guide unit (5) (step S104). The light returned by the reflecting mirror (6) repeats multiple reflection at the reflection surface (52) of the first light guide unit (5) again and returns to the entrance opening (51) (step S105).

The light returning to the entrance opening (51) enters the first diffusion unit (4) provided at the entrance opening (51) again. Most of the entering light critical-angle-reflects at the diffusing surface (42) of the first diffusion unit (4) and returns from the entrance opening (51) to inside the first light guide unit (5) again (step S106).

The light returning to inside the first light guide unit (5) repeats multiple reflection at the reflection surface (52) on the first light guide unit (5) again and is guided to the exit opening (53) (step S107). The guided light passes through the opening (61) on the reflecting mirror (6). The light passing through the opening (61) on the reflecting mirror (6) enters the display region (21) of the liquid crystal panel (2) through the light collecting unit (7) and the second diffusion unit (8) as recycled light (step S108).

On the other hand, the remaining light passes through the opening (61) on the reflecting mirror (6) and enters the light collecting unit (7) (step S109). The light collecting unit (7) collects the light passing through the opening (61) on the reflecting mirror (6) toward the second diffusion unit (8) side (step S110). The second diffusion unit (8) diffuses the light collected by the light collecting unit (7) toward the liquid crystal panel (2) (step S111).

As described above, the opening (61) on the reflecting mirror (6) is formed correspondingly to the display region (21) where the liquid crystal panel (2) performs display, according to the present first embodiment. Consequently, part of light passing through the opening (61) on the reflecting mirror (6) enters the display region (21) of the liquid crystal panel (2) alone through the light collecting unit (7) and the second diffusion unit (8). Accordingly, light is not projected on a region other than the display region (21) of the liquid crystal panel (2), and therefore a temperature rise, contrast degradation, and high-temperature-based reliability degradation of the liquid crystal panel (2) can be suppressed.

Moreover, the remaining light not passing through the opening (61) on the reflecting mirror (6) and being reflected and returned to the first light guide unit (5) by the reflecting mirror (6) critical-angle-reflects at the diffusing surface (42) of the first diffusion unit (4). Then, the light passes through the opening (61) on the reflecting mirror (6) and enters the display region of the liquid crystal panel (2) through the light collecting unit (7) and the second diffusion unit (8) as recycled light. By reusing the recycled light, a high-efficiency and high-intensity liquid crystal panel (2) can be provided.

Second Embodiment

Figure 6:
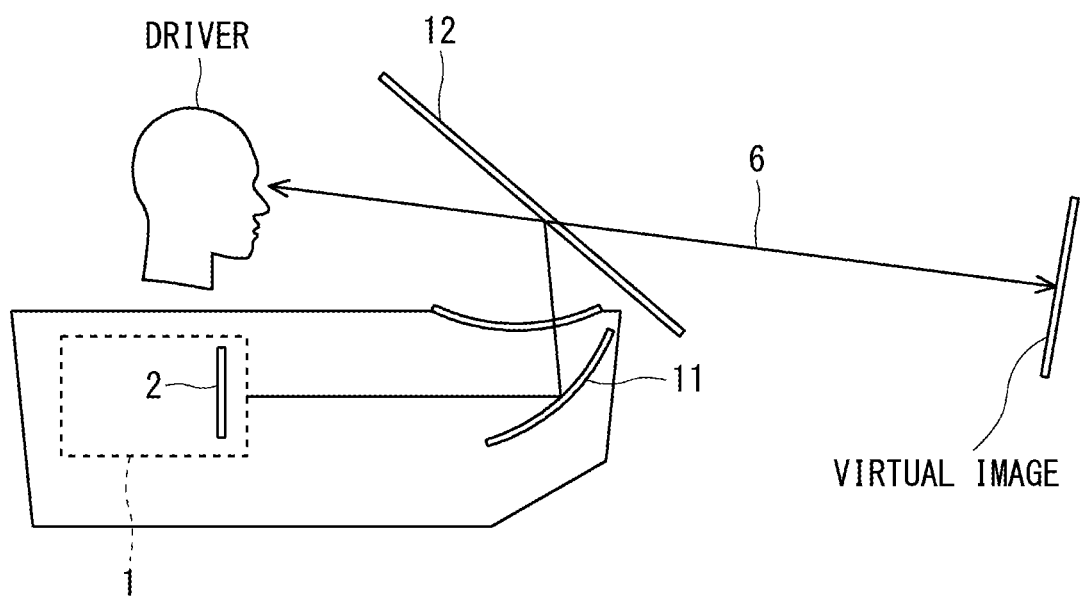
FIG. 6 is a diagram illustrating a schematic configuration of a head up display according to the first embodiment of the present invention.

FIG. 6 is a diagram illustrating a schematic configuration of a head up display according to a second embodiment of the present invention. For example, the liquid crystal illumination device (1) according to the aforementioned first embodiment may be equipped on a head up display (10). For example, the head up display (10) is arranged in an instrument panel at the front of an automobile cabin.

The head up display (10) magnifies an image displayed on the liquid crystal panel (2) in the liquid crystal illumination device (1) according to the aforementioned first embodiment by an optical system (11) and displays the resulting image in the forward field of vision of a driver through a windshield (12) as a virtual image. For example, the virtual image is set in such a way as to be seen 2 m to 3 m ahead of the driver. A field of view (FOV) indicating a virtual image size is horizontally 5° and vertically 2°. At this time, an indicator indicating definition of the image is 60 to 80 dots/° with respect to the aforementioned FOV angles.

The liquid crystal illumination device (1) outputs image light penetrating the liquid crystal panel (2) to the optical system (11). For example, the optical system (11) is composed of a mirror such as a concave mirror, a lens, and the like. The optical system (11) guides image light output from the liquid crystal illumination device 1 to, for example, the windshield (12) at the front of the cabin. Consequently, the image light entering the windshield (12) reflects on a surface of the windshield (12) inside the cabin and is displayed as a virtual image formed on a retina of an observer.

By configuring the head up display (10) by use of the liquid crystal illumination device (1) according to the aforementioned first embodiment, downsizing and weight reduction, cost reduction, and light utilization efficiency of the head up display (10) can be enhanced. Further, display quality of the head up display (10) can be enhanced.

The liquid crystal illumination device (1) according to the aforementioned first embodiment is equipped on the head up display (10) but may be equipped on any device illuminating the liquid crystal panel (2), without being limited to the head up display.

Several embodiments of the present invention have been described; however, the embodiments are presented as examples and do not intend to limit the scope of the invention. The new embodiments may be implemented in various other forms, and various omissions, substitutions, and changes may be made without departing from the spirit of the invention. The embodiments and modifications thereof are included in the scope and spirit of the invention and are also included in the invention described in the claims and equivalents thereof.

Figure 7:
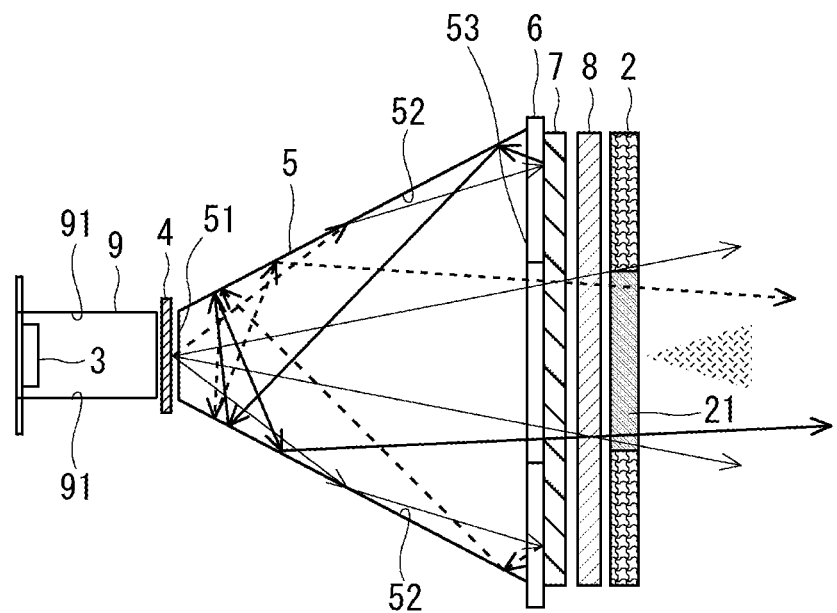
FIG. 7 is a diagram illustrating a schematic configuration of a liquid crystal illumination device including a second light guide unit.

For example, as illustrated in FIG. 7, a second light guide unit (9) may be provided between the light source (3) and the first diffusion unit (4), according to the aforementioned embodiments. The light source (3) is provided at one end of the second light guide unit (9). The second light guide unit (9) includes a reflection surface (91) parallel to an optical axis connecting the liquid crystal panel (2) and the light source (3). The second light guide unit (9) reflects light projected by the light source (3) at the reflection surface (91) and guides the light to the first diffusion unit (4).

A luminance distribution of light exiting from the light source (3) can be uniformed by the second light guide unit (9). Further, the second light guide unit (9) can also guide light with a large light distribution angle to the first diffusion unit (4) side by including the reflection surface (91) parallel to the optical axis and can guide light projected from the light source (3) to the first diffusion unit (4) with high efficiency. In other words, light utilization efficiency can be further enhanced.

What is claimed is:

1. A liquid crystal illumination device comprising:
a liquid crystal panel;
a light source configured to project light to the liquid crystal panel;
a first diffusion unit configured to be provided adjacent to the light source and diffuse light projected from the light source;
a first light guide unit configured to be provided with the first diffusion unit at one end, include a reflection surface formed in such a way as to radially widen from the light source side toward the liquid crystal panel side, reflect light diffused by the first diffusion unit at the reflection surface, and guide the light;
a reflecting mirror configured to be provided at another end of the first light guide unit, an opening being formed on the reflecting mirror, part of the light guided by the first light guide unit being reflected and returned to inside the first light guide unit, and remaining light passing through the opening;
a light collecting unit configured to be provided adjacent to the reflecting mirror and collect light passing through the opening on the reflecting mirror; and
a second diffusion unit configured to be provided adjacent to the light collecting unit and diffuse the light collected by the light collecting unit toward the liquid crystal panel, wherein
the opening on the reflecting mirror is formed to correspond to a display region where the liquid crystal panel display an image, and
a haze value of the first diffusion unit is set to a value higher than a haze value of the second diffusion unit.

2. The liquid crystal illumination device according to claim 1, wherein a haze value of the first diffusion unit is set to 90% or greater.

3. The liquid crystal illumination device according to claim 1, further comprising a second light guide unit configured to be provided between the light source and the first diffusion unit, and include a reflection surface parallel to an optical axis connecting the liquid crystal panel and the light source.

4. A head up display comprising:
the liquid crystal illumination device according to claim 1; and an optical system configured to guide image light passing through a liquid crystal panel in the liquid crystal illumination device to a windshield of a vehicle.

5. An illumination method for a liquid crystal illumination device including a liquid crystal panel and a light source configured to project light to the liquid crystal panel, the illumination method comprising:
- a step of diffusing light projected from the light source by a first diffusion unit;
- a step of reflecting light diffused by the first diffusion unit by a first light guide unit on a reflection surface and guiding the light, the first light guide unit including the reflection surface being formed in such a way as to radially widen from the light source side toward the liquid crystal panel side;
- a step of reflecting part of light guided by the first light guide unit by a reflecting mirror on which an opening is formed and returning it to inside the first light guide unit, remaining light passing through the opening;
- a step of collecting the light passing through the opening on the reflecting mirror; and
- a step of diffusing the collected light toward the liquid crystal panel by a second diffusion unit, wherein
- the opening on the reflecting mirror is formed to correspond to a display region where the liquid crystal panel display an image, and
- a haze value of the first diffusion unit is set to a value higher than a haze value of the second diffusion unit.

\* \* \* \* \*